(No Model.) 2 Sheets—Sheet 1.
R. M. ARTUS.
VEHICLE BRAKE.
No. 604,286. Patented May 17, 1898.
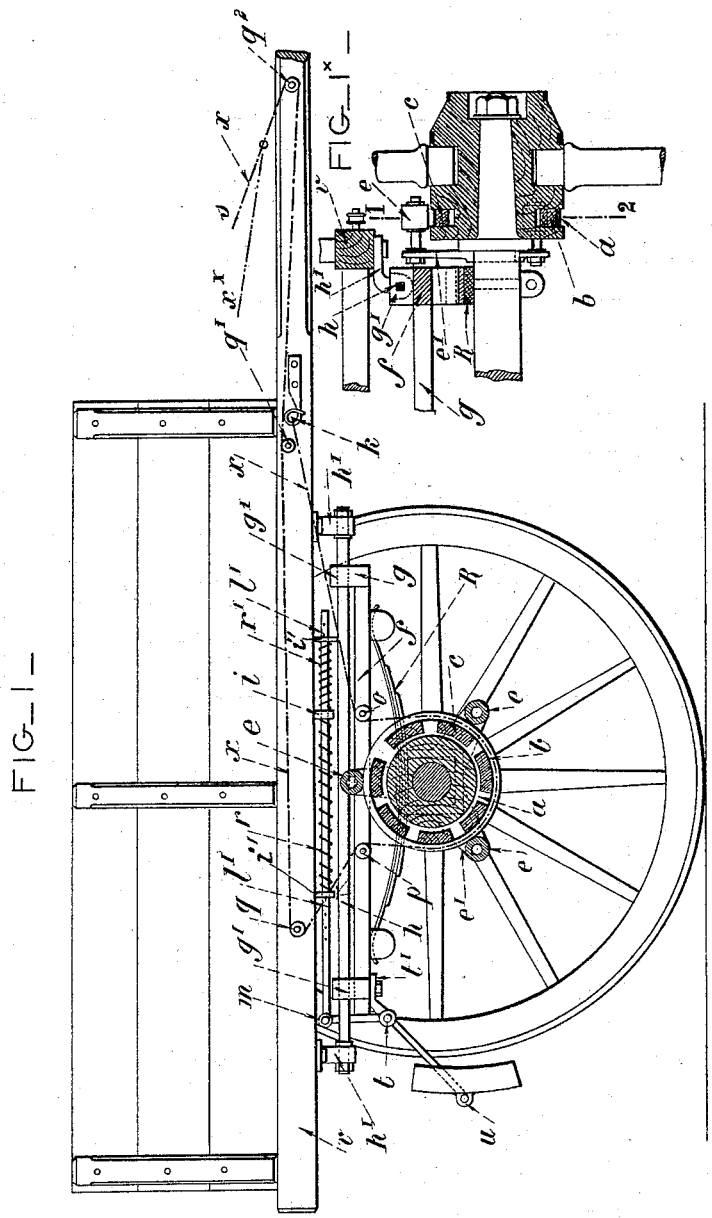
WITNESSES.
John Lotka
C Sedgwick
INVENTOR:
René Marie Artus Vicomte de Chivré
BY
Munn & C
ATTORNEYS (No Model.) 2 Sheets—Sheet 2.
R. M. ARTUS.
VEHICLE BRAKE.
No. 604,286. Patented May 17, 1898.
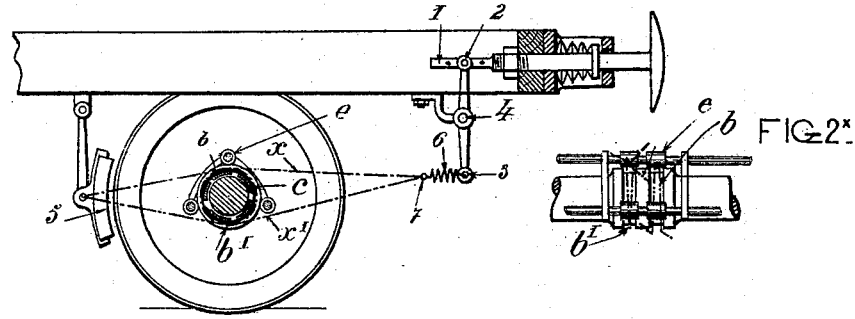
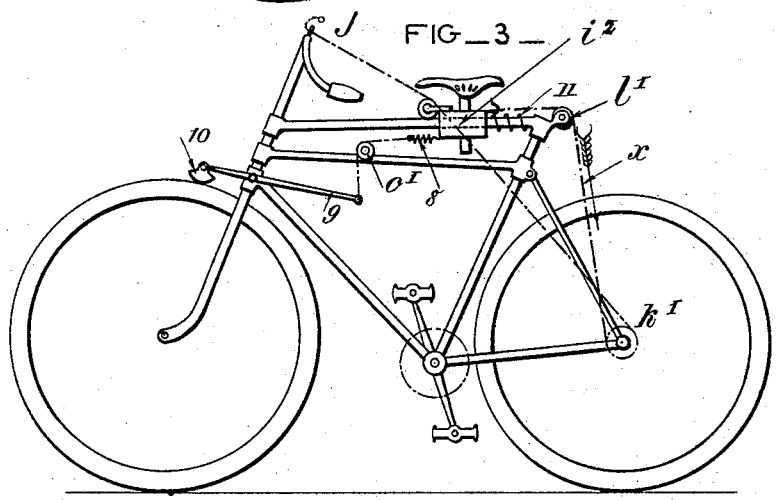
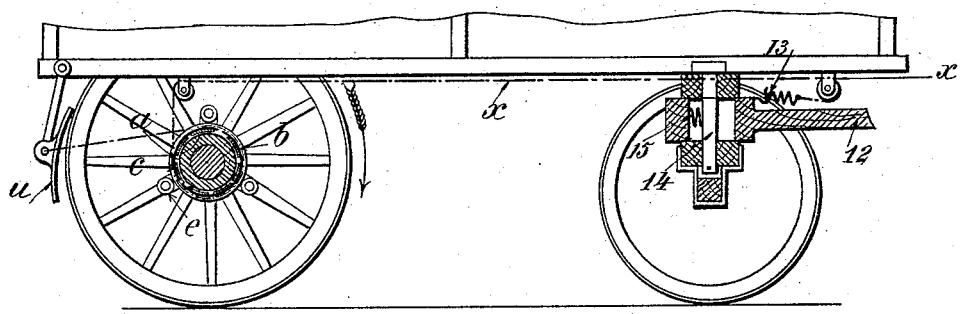
WITNESSES.
John Lotka
C. Sedgwick
INVENTOR:
René Marie Artus Vicomte de Chivré
BY
Munn & Co
ATTORNEYS

UNITED STATES PATENT OFFICE.

RÉNÉ MARIE ARTUS, OF GONNEVILLE, FRANCE.

VEHICLE-BRAKE.

SPECIFICATION forming part of Letters Patent No. 604,286, dated May 17, 1898.

Application filed April 24, 1895. Serial No. 547,002. (No model.) Patented in France September 28, 1894, No. 241,698, and in Germany April 14, 1895, No. 87,568.

*To all whom it may concern:*

Be it known that I, RÉNÉ MARIE ARTUS, vicomte de Chivré, attaché of the financial office, a citizen of the Republic of France, and a resident of Gonneville, par Saint Pierre-Eylise, (Department of the Manche,) France, have invented new and useful Improvements in Vehicle-Brakes, (for which I have obtained Letters Patent in France, dated September 28, 1894, No. 241,698, and in Germany, No. 87,568, dated April 14, 1895,) of which the following is a specification.

My invention relates to an improved brake for vehicles of all kinds.

The principle of my invention is the application of a pull on a flexible connection adapted for frictional contact with the shaft, wheel, hub, or other rotating part of the vehicle, said flexible connection being operatively connected to the brake proper, and the friction between said connection and the rotatable part produces a tension on the connection, and the tension is availed of to apply the brake. This principle may be embodied in various manners, and in the accompanying drawings I have shown several forms of construction of my improved brake mechanism.

The particular manner in which the invention may be performed will be fully described hereinafter, and the features of novelty pointed out in the claims.

Reference is to be had to the accompanying drawings, forming a part of this specification, in which similar characters of reference indicate corresponding parts in all the figures.

Figure 1 is a side elevation, partly in section, on the line 1 2 of Fig. 1$^\times$, of a two-wheeled vehicle provided with my improved brake. Fig. 1$^\times$ is a broken sectional elevation taken longitudinally of the vehicle-axle. Fig. 2 is a broken side elevation with parts in section, showing the application of my improved brake mechanism to a railway-carriage. Fig. 2$^\times$ is a broken end or front elevation of the brake proper. Fig. 3 is a side elevation of a bicycle with my improvement applied thereto; and Fig. 4 is a side elevation, with parts in section, of a four-wheeled vehicle fitted with my improved brake mechanism.

As illustrated in Figs. 1 and 1$^\times$, the hub of one of the wheels is provided on the inside— that is, on the side facing the body of the vehicle—with a circular groove $a$, in which is located an elastic metallic collar $b$, which is split and has a tendency to open. This collar is provided on its inner surface with a series of shoes $c$ and is confined between three rollers $e$, which are journaled on a spider $e'$, secured to the axle of the vehicle. The collar, however, is free to rotate on the hub of the wheel. A frame $f$ $g$, connected by supporting-springs R to the axle of the vehicle, is provided at its four corners with slides $g'$, which are mounted to move longitudinally of the vehicle on rails or bars $h$, secured to brackets $h'$, which are fastened to the longitudinal beams $v$ of the vehicle.

A stop $i$, fixed to the under side of the body, is apertured for the passage of the rod $l$, having a sliding movement therein. This rod $l$ has pivoted to its rear end $m$ a lever $m$ $t$ $u$, pivoted at $t$ on a bracket $t'$, projecting from the frame $f$ $g$, said lever also carrying at $u$ the brake-shoe. The rod $l$ carries two springs $r$ $r'$, coiled on it, each on one side of the stop $i$, and collars $i'$ and bolts or pins are provided for holding the outer ends of the said coil-springs, the pins passing through apertures $l'$ in the rod $l$. In this manner the tension of the springs may be adjusted. The springs are so adjusted that normally the body of the vehicle will have the center of gravity vertically above the axle.

A cord $x$, secured to the shafts or pole at $k$, passes over a guide-roller $o$ on the frame $f$ $g$ and is wound around the split collar $b$, provided with shoes $c$, the rear end of the said cord passing over guide-rollers $p$ and $q$, the cord then again extending forward over guide-rollers $q'$ and $q^2$ and being secured at $s$ to the holdback-strap of the harness. Another cord $x^\times$ is secured to the main cord $x$ between the roller $q^2$ and the point of attachment to the holdback-strap. The end of this cord $x^\times$ is located within reach of the driver for a purpose to be hereinafter stated. It will thus be seen that the brake-shoe is connected to the end of the cord through the medium of the vehicle-body, so that when a pull is exerted on said end of the cord the pull will first come on the vehicle-body and will be transmitted by it to the brake-shoe, causing it to be applied.

When the carriage travels on level ground, the parts will be in the position illustrated by Fig. 1. When on an upgrade, the center of gravity of the body will naturally move rearward, but since the horse exerts a greater traction effort the spring $r'$ in front of the stop $i$ is compressed and causes the lever $m\ t$ to be moved, said lever then colliding with the front end $g$ of the frame $f\ g$—that is, the body of the vehicle is displaced forwardly, so as to maintain the equilibrium. During this movement the brake-shoe $u$ is kept away from the wheel. On a downgrade the opposite action takes place, the center of gravity being shifted rearwardly, and at the same time the brake is actuated, since the horse exerts a pull on the holdback-strap, and thereby draws the cord $x$ forward, so as to compress the split collar $b$ until it is in frictional contact with the hub of the wheel. As soon as such frictional contact takes place the cord $x$ is placed under tension, there being a pull on the portion of the cord between the points $o$ and $k$. The body of the vehicle, therefore, will be drawn rearwardly and in proportion to the pull on the holdback-strap. The stop $i$, moving rearward with the body, compresses the rear spring $r$ and likewise moves the rod $l$ rearward to actuate the lever $m\ t\ u$, and thus cause the brake-shoe $u$ to be applied. It will be readily understood that the action of the brake will be in proportion to the steepness of the grade. The purpose of the cord $x^\times$ is to enable the driver to apply the brake whenever this is desired, the mechanism acting in the same manner as when the holdback-strap is pulled backward.

It will be readily seen that in the above-described construction the brake is applied by the pull exerted on the portion of the cord between the points $o$ and $k$ when the collar $b$ comes in frictional contact with the wheel-hub. This pull moves the vehicle-body rearward, and the movement of the body causes the application of the brake. The body therefore forms an operative connection between the cord $x$ and the brake to transmit the movement of the cord to the brake.

In Figs. 2 and $2^\times$ I have shown the application of my improved brake to a railway-carriage, the brake being actuated by the movement of the buffers. Since such carriages are intended to run both ways, I provide the axle of the carriage with two split collars of the character described with reference to Fig. 1, and the cord $x'$ is wound on the second collar $b'$ in the opposite direction to that in which the cord $x$ winds on the collar $b$.

The connection with the buffer is as follows: The buffer has a square portion 1 at its inner end, and to said square portion is pivoted one arm 2 of a lever fulcrumed at 4 on a suitable part of the carriage, the other end 3 of the lever being connected to the cords $x$ and $x'$ through the intermediary of a spring 6. This spring is not an indispensable part of the construction. It will be obvious that when the buffer acts one way, the cord $x$ will be drawn tight to cause the operation of the brake-shoe 5 in the manner hereinbefore described, and when the buffer moves in the opposite direction the cord $x'$ will be operated in a similar way. Instead of the two cords I might employ a single one passing over a pulley located at 7 and wound one way on the collar $b$ and the other way on the collar $b'$.

It will be understood that this brake will be automatic in all cases where the cars bump against each other, as in the event of their striking an obstacle or of derailment, and the more sudden the stopping of the car is the more energetic is also the action of the brake. It will also be seen that each car has its independent brakes and that the brakes are controlled from the engine.

In order that the train may be enabled to travel backward by the engine pushing the train, it is necessary to give a proper strength to the buffer-springs or to provide a special mechanism for releasing all the brakes.

When applied to a safety-bicycle, as illustrated in Fig. 3, my improved brake mechanism may be operatively connected with the seat. The seat, as shown, is secured to a sleeve $i^2$, which is mounted to slide longitudinally on the frame, and at its rear end it is connected with the cord $x$, winding around the collar on the axle of the driving-wheel, said collar being of the same nature as the collar $b$, Fig. 1. A spring 11 normally pushes the seat forward. The cord $x$ after being passed around the collar extends to the handle or other operating device located within the reach of the rider. The seat is connected at its front end with the brake 10, provided with a lever 9, fulcrumed on the machine, the said lever being connected to the seat by means of a cord passing over a pulley $o'$, and a spring 8 being secured to the said cord and to the seat. The operation of this form of my invention is as follows: The rider pulls the button at the end of the cord $x$, which I have indicated at J, and thereby compresses the split collar into frictional contact with the hub of the wheel, this movement then causing the seat to be pulled backward against the tension of the spring 11, and the backward movement of the seat pulls the brake-lever upward, so as to throw the brake-shoe 10 against the tire of the wheel. When the brake is released, the spring 11 will restore the seat to its normal position.

As illustrated in Fig. 4, the vehicle is provided with the body supported on the wheels, but not slidable longitudinally thereof, and the brake may be operated through the medium of a hold back-strap in a similar manner to that illustrated in Fig. 1, or the operation of the brake may be accomplished in the following manner: The draft attachment 12 may be made to slide longitudinally of the body together with the pivot-bolt 14, which connects it thereto, and the cord $x$ in that case is connected with the said longitudinally-movable draft device. Thus when the operator drawing the cart stops and the draft device thereby is caused to move rearward relatively to the cart-body the cord $x$ is pulled rearward at its front end, and the brake is applied in the same manner as hereinbefore described.

I desire it to be understood that instead of a split collar $b$ such as I have hereinbefore described I may employ any equivalent part or band that normally is out of engagement with a rotating part of the vehicle and is connected to operative means for throwing it into frictional engagement with the said rotating part, the tension produced by the frictional engagement being utilized for the application of the brake.

It will be seen that in each of the constructions shown one end of the flexible connection engaging the split collar is secured to a part receiving a draft or pull at the time the brake is to be applied, and the other end is operatively connected to the brake, the connection being either a direct one, as in Figs. 2 and 4, or being effected through the medium of a movable or sliding part, such as the sleeve $i^2$ in Fig. 3 or its equivalent in Fig. 1—viz., the carriage-body.

Having thus fully described my invention, I claim as new and desire to secure by Letters Patent—

1. In a brake mechanism, the combination with a vehicle having one of its constituent parts movable longitudinally relatively to the wheels, of an expansible collar loosely mounted on a rotating part of the vehicle, a cord or chain wound around the said collar and connected with the movable part of the vehicle, and a brake operated by the movement of the said movable part of the vehicle, substantially as herein shown and described.

2. In a brake mechanism, the combination with a vehicle having one of its constituent parts longitudinally movable relatively to the wheels, of an expansible collar loosely mounted on a rotating part of the vehicle, a chain or cord wound around the said collar and connected with the movable part of the vehicle, a pivoted brake-lever, and a connection between the brake-lever and the said movable part of the vehicle, substantially as herein shown and described.

3. In a brake mechanism, the combination with a vehicle having one of its constituent parts longitudinally movable and spring-pressed, of an expansible collar loosely mounted on the hub of one of the wheels of the vehicle, a cord or chain wound around the said collar and connected with the movable part of the vehicle, a pivoted brake-lever, and a connection between the said brake-lever and the movable part of the vehicle, substantially as herein shown and described.

4. In a brake mechanism, the combination with a vehicle-body longitudinally movable relatively to the wheels, of an expansible collar loosely mounted on the hub of one of the wheels, a cord or chain wound around the said collar and having one end connected to the vehicle-body and its other end adapted to have a pull exerted thereon to compress the collar on the hub of the wheel, a pivoted brake-lever, and a connection between the brake-lever and body, substantially as described.

5. In a brake mechanism, the combination with a wheel-supported frame, of a vehicle-body mounted to slide longitudinally on said frame, an expansible collar loosely mounted on the hub of one of the wheels, a cord or chain wound around the said collar and having one end secured to the body, the other end of the said cord or chain being adapted to have a pull exerted thereon to compress the collar into frictional engagement with the hub, springs for pressing the body forwardly and rearwardly, a pivoted brake-lever, and a connection between the brake-lever and body, substantially as described.

6. In a brake mechanism, the combination with a wheel-supported frame, of the body fitted to slide longitudinally on said frame, an expansible collar loosely mounted on the hub of one of the wheels, a cord or chain wound around the collar and having one end secured to the body, the other end of the cord or chain being adapted to have a pull exerted thereon to compress the collar into engagement with the hub, a sliding rod on the under side of the body, springs on said rod and serving to press the body forwardly and rearwardly, and a pivoted brake-lever having one end pivoted to the sliding rod, substantially as herein shown and described.

7. A brake mechanism for vehicles, comprising an expansible collar mounted to rotate loosely on one of the rotating parts of the vehicle, a flexible connection extending around said loose collar to compress the same and bring it into frictional engagement with the said rotating part, a draft-receiving device to which one end of said connection is secured, a vehicle-body movable longitudinally of the vehicle relatively to the wheels, the other end of the flexible connection being connected to said movable body, and a brake actuated by the movement of the body, substantially as described.

In testimony that I claim the foregoing as my invention I have signed my name, in presence of two witnesses, this 22d day of March, A. D. 1895.

RÉNÉ MARIE ARTUS.

Witnesses:
S. RAUREND,
EUGÉNE WALLICE.